Figure 1:
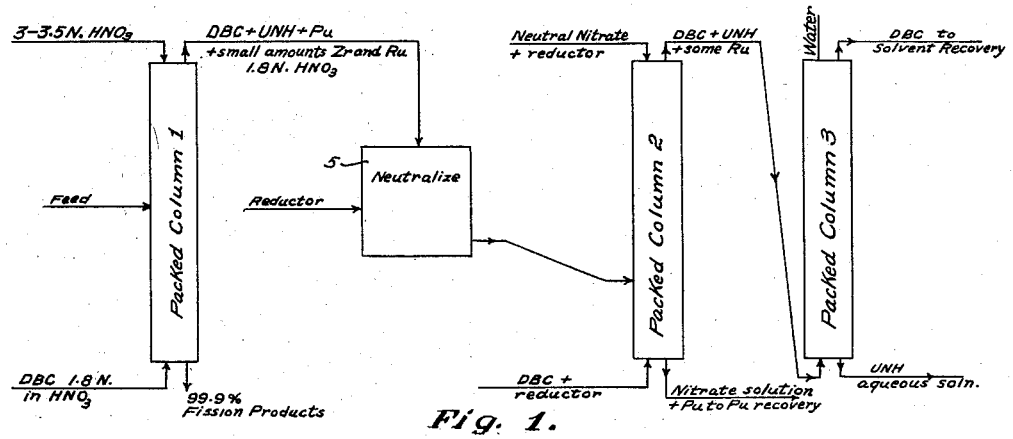

Oct. 13, 1959  C. M. NICHOLLS ET AL  2,908,547
SEPARATION OF URANIUM, PLUTONIUM AND FISSION PRODUCTS
Filed Sept. 19, 1949

INVENTORS:
Cyril M. Nicholls, Ivor Wells and R. Spence
BY
Alex. E. MacRae
Attorney.

United States Patent Office 2,908,547
Patented Oct. 13, 1959

2,908,547

SEPARATION OF URANIUM, PLUTONIUM, AND FISSION PRODUCTS

Cyril Minchin Nicholls and Ivor Wells, Deep River, Canada, and Robert Spence, Didcot, England, assignors, by mesne assignments, to the United States of America as represented by the United States Atomic Energy Commission Application September 19, 1949, Serial No. 116,558

1 Claim. (Cl. 23—14.5)

This invention relates to the separation of uranium and plutonium from neutron irradiated uranium which contains fission products.

The object of the invention is to provide a convenient and effective method for the treatment of neutron irradiated uranium in order to remove the plutonium and uranium from the fission products and to separate the plutonium from the uranium.

In carrying out the invention, the irradiated uranium is dissolved in concentrated nitric acid to provide an aqueous acidic solution of nitrate salts of the uranium, plutonium and the fission products. The latter may include zirconium, cerium, ruthenium and the like. In dissolving the irradiated uranium sufficient nitric acid is used to provide a solution from about 2 to 4 N but preferably about 3 N in nitric acid. To extract the uranium and plutonium, this solution is treated with an organic solvent rendered about 1.8 N in nitric acid. One extraction of the solution with an equal volume of the acidified solvent followed by three successive extractions with one-half volume amounts of fresh solvent recovers about 98% of the uranium and over 99% of the plutonium in the original solution. Over 99% of the fission products remain in the residual aqueous solution.

Dibutoxydiethylether—usually called dibutyl Carbitol—is the preferred solvent, but methylisobutyl ketone and dibutyl Cellosolve may be used. The solvent is preferably rendered about 1.8 N in nitric acid to avoid extraction of nitric acid from the aqueous phase into the organic solvent phase.

The solvent is preferably acidified with nitric acid to an amount which is in equilibrium substantially with the acid in the resulting aqueous phase. With an aqueous phase 3 N in nitric acid, the solvent phase in equilibrium therewith will be about 1.8 N in nitric acid. This latter equilibrium normality will vary slightly with the amount of uranylnitrate hexahydrate present. This equilibrium normality increases with the amount of uranium present in the aqueous phase.

The organic solvent extract containing uranium and plutonium is now substantially neutralized with a suitable base such as ammonium hydroxide, aluminum hydroxide (freshly precipitated), ammonia, calcium hydroxide, zinc hydroxide or the like. The organic solvent extract should be brought to an acidity less than 0.5 N and preferably less than 0.1 N. It may be slightly alkaline say to 0.1 N but not so alkaline as to precipitate uranium which would settle out in undesirable places and carry part of the plutonium.

The plutonium in the organic solvent extract which may be accompanied by an aqueous phase resulting from the neutralization above described is now reduced to the trivalent state by a reducing agent. The so reduced plutonium then passes into the aqueous phase which is separated from the organic solvent phase. Effective reducing agents are hydroxylamine base, hydroxylamine nitrate, hydroxylamine hydrochloride, hydroquinone, hydrazine, ferrous sulphamate, acidic ferrous sulphamate, hydrazine salts, ferrous sulphate plus hydrazine and sulphur dioxide. One advantage of hydroxylamine base is that it dissolves readily in dibutyl Carbitol and the desired reduction is carried out by its addition to this solvent. On the other hand a compound of hydroxylamine, such as the nitrate or hydrochloride, may be added to the substantially neutral organic solvent phase to effect the reduction of the plutonium when hydroxylamine compound is used. About one gram of the reducing agent per litre of the combined organic solvent and aqueous phase is adequate for the purpose.

The organic solvent extract and any accompanying aqueous solution is treated with a solution, e.g., about one-quarter volumes, four times, of an aqueous nitrate salt solution such as ammonium nitrate, aluminum nitrate, calcium nitrate, zinc nitrate or the like. A solution comprising 70% to 90% saturated ammonium nitrate is convenient. A solution containing 0.8 to 1.5 moles of aluminum nitrate is also useful. The nitrate solution used is slightly acid in nitric acid to prevent precipitation of plutonium, say 0.1 N $HNO_3$. Higher acidities may be used but the subsequent recovery of plutonium is not so high with higher acidities. The reduced plutonium passes into the aqueous nitrate solution and most of the uranium remains in the organic solvent. Four successive treatments by the nitrate solution of the solvent extract, using each time the volume of the solvent extract of nitrate solution adequately recovers the plutonium in the nitrate solution.

Treatment of the organic extract with four successive lots of the nitrate solution each in volume equal to the volume of the organic extract leaves 98–99% of the uranium in the solvent extract and the plutonium substantially free from fission products is recovered in the aqueous nitrate salt solution phase.

The organic solvent phase containing uranium and small residual amounts of fission products is washed with water to recover the uranium as uranylnitratehexahydrate. One wash with an equal volume of water followed by three successive volumes in half the amount of the organic solvent phase volume recovers over 99% of the uranium. After adequate removal of uranium from the organic solvent phase, the solvent may be recovered by distillation under vacuum or by steam distillation. It is preferable to treat the organic solvent with active charcoal before distillation to remove the residual uranium and fission products.

A convenient and efficient method of continuous operation is illustrated in the accompanying drawing in which the flow is shown diagrammatically. Columns 10 to 30 feet in height depending on flow rates therein, have been found effective in giving good recoveries.

The columns may be packed with any one of a number of well-known packings in glass, porcelain or stainless steel, the latter being preferred for large installations. Lessing rings, Raschig rings, Fenske helices may be used.

The acid nitrate solution of irradiated uranium rod to be treated in the column method may conveniently contain 0.45 to 1.0 gram uranylnitratehexahydrate (designated on the sketch as UNH) per ml., say 15 grams fission products and perhaps 10 grams of plutonium per 300 litres.

This nitrate solution is adjusted to a normality of 2 to 4 preferably 3 to 3.5 in nitric acid. This is fed into column 1 at about the mid point of its height whilst dibutyl Carbitol (designated on the sketch as DBC) adjusted to a normality of 1.8 in nitric acid is fed into the bottom of the column. There is also fed into the top of column 1 an aqueous 3–3.5 N nitric acid. This acts as a scrubber for fission products, i.e., it selectively washes some of the zirconium and ruthenium from the rising dibutoxydiethylether. There is recovered at the bottom of column 1 an aqueous nitric acid solution containing 99.9% of the fission products. This effluent nitric acid solution contains very low amounts of nitrates other than fission product nitrates.

From the top of column 1 is recovered dibutyl Carbitol containing nearly all the uranylnitratehexahydrate, plutonium and very small amounts of zirconium ruthenium and cerium. It is about 1.8 N, in nitric acid. It is conveniently fed into vessel 5 where it is neutralized. Suitable neutralizing agents comprise ammonia, zinc oxide or hydroxide and aluminum hydroxide. Vessel 5 contains aqueous phase resulting from neutralization and a dibutoxydiethylether phase. A reductor for plutonium is conveniently added to vessel 5. These phases are mixed together and fed into column 2 at a point about ⅓ its height above its bottom.

To the top of column 2 is added an aqueous nitrate solution containing preferably a further quantity of reductor for plutonium. Suitable salts for this nitrate solution comprise ammonium nitrate, aluminum nitrate, calcium nitrate, and zinc nitrate. If ammonium nitrate is used, the solution is practically 70 to 90% saturated with it. If aluminum nitrate or zinc nitrate are used the solution is about half saturated. This solution contains reductor as fed to the column. Hydroxylamine or like reductor may be added to this nitrate solution in an amount equal to one gram for each litre of dibutoxydiethylether treated by the nitrate solution.

To the bottom of column 2 is fed fresh dibutoxydiethylether and there is recovered from the top of the column dibutoxydiethylether containing uranylnitratehexahydrate and residual ruthenium. This dibutoxydiethylether containing practically all the original uranylnitratehexahydrate is fed into the bottom of column 3. From the bottom of column 2 is recovered aqueous nitrate solution containing plutonium which is sent to plutonium recovery.

To th etop of column 3 is fed water or very dilute nitric acid say about 0.05 N, and from its bottom is recovered uranylnitratehexahydrate in aqueous solution which is sent to uranium recovery. From the top of column 3 is recovered dibutoxydiethylether which is sent to the solvent recovery process.

Figure 2:
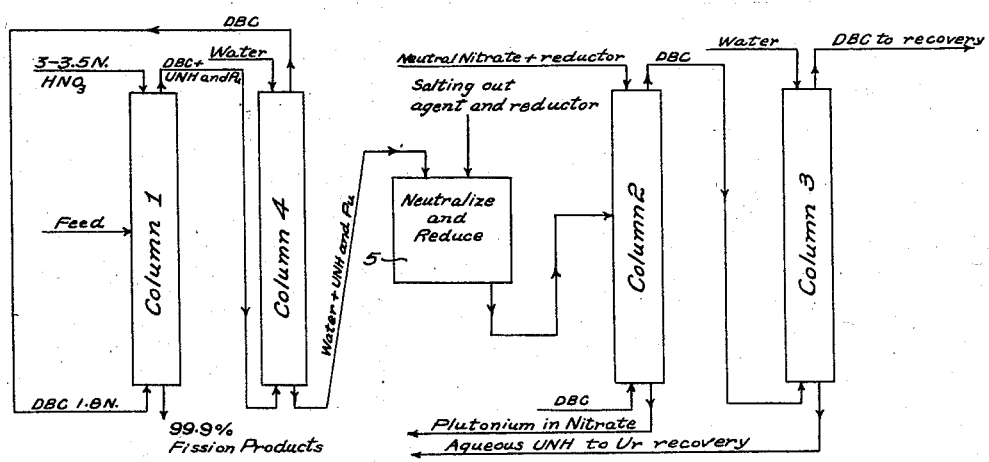

Alternative methods of operating a column retracting and recovery process are practicable as shown in Figure 2 accompanying based on the invention hereinbefore described.

In another alternative method (Figure 2) a fourth column is added in the processing. In this method 3 to 3.5 N aqueous nitric acid is fed to the top of column 1. Dibutoxydiethylether adjusted in acidity to resulting equilibrium with the aqueous nitric acid fed to the top of column one is fed to the bottom of column 1. With a 3 N nitric acid solution the dibutoxydiethylether should be adjusted to about 1.8 N in nitric acid. The feed solution to be treated has been above described and it is fed to the mid height point of column 1.

From the top of column 1 is recovered dibutoxydiethylether containing practically all the uranium and plutonium and low amounts of fission products and this dibutoxydiethylether is fed into the bottom of column 4. From the bottom of column 1 is recovered a nitric acid solution containing upwards of 99.9% of the fission products with practically no salts of other elements. Water is fed to the top of column 4 and dibutoxydiethylether substantially free of uranium and plutonium is recovered from the top of column 4. This dibutoxydiethylether is adjusted to proper equilibrium in acid to a 3 to 3.5 N aqueous nitric acid and is fed to the bottom of column 1. From the bottom of column 4 is recovered an acidic aqueous solution containing practically all the uranium and plutonium which is fed into vessel 5 where it is neutralized by a suitable base and reduced as above described. Bases above mentioned serve this purpose. A salting out agent is added to vessel 5. Salting out agents are ammonium nitrate, aluminum nitrate, calcium nitrate, zinc nitrate and the like. When ammonium nitrate is the salting out agent it is added to about 70% to about 90% saturation of the solution. In case aluminum nitrate is used, about 0.8 to about 1.5 moles are added. The resulting aqueous solution from vessel 5 is fed into column 2 at about its mid height. Dibutoxydiethylether is fed to the bottom of column 2. This dibutoxydiethylether (which may contain small amounts of dissolved water) may advantageously contain added reductor for plutonium such as hydroxylamine which is soluble in dibutoxydiethylether. A neutral aqueous nitrate salt solution as described in the foregoing alternatives and advantageously containing reductor for plutonium, is fed to the top of column 2. From the bottom of column 2 is recovered aqueous nitrate solution containing practically all of the plutonium and very low amounts of uranium. From the top of column 2 is recovered dibutoxydiethylether containing practically all the uranium which is fed to column 3 at its bottom. Water is fed to the top of column 3, aqueous solution of uranylnitratehexahydrate is recovered from the bottom for recovery of uranium and dibutoxydiethylether phase practically free of uranium is recovered from the top of column 3.

What is claimed is:

In the treatment of neutronic irradiated uranium for the removal of fission products and plutonium values, the method which comprises dissolving the material in nitric acid to provide an aqueous solution 3 N in nitric acid, treating the solution with dibutyl carbitol substantially 1.8 N in nitric acid to separate fission products, separating the aqueous phase from the organic solvent phase, neutralizing the organic solvent phase, reducing the plutonium therein with hydroxylamine base to the trivalent state, adding an aqueous ammonium nitrate solution, treating the mixture with the organic solvent to extract uranium and leave the reduced plutonium in the aqueous phase and separating the aqueous phase from the organic extract phase.

References Cited in the file of this patent

UNITED STATES PATENTS

| | | |
|---|---|---|
| 679,575 | Reese | July 30, 1901 |
| 2,227,833 | Hixson et al. | Jan. 7, 1941 |
| 2,717,696 | Schubert | Sept. 13, 1955 |
| 2,780,518 | Gates et al. | Feb. 5, 1957 |
| 2,811,415 | Seaborg | Oct. 29, 1957 |